Patented Dec. 19, 1944

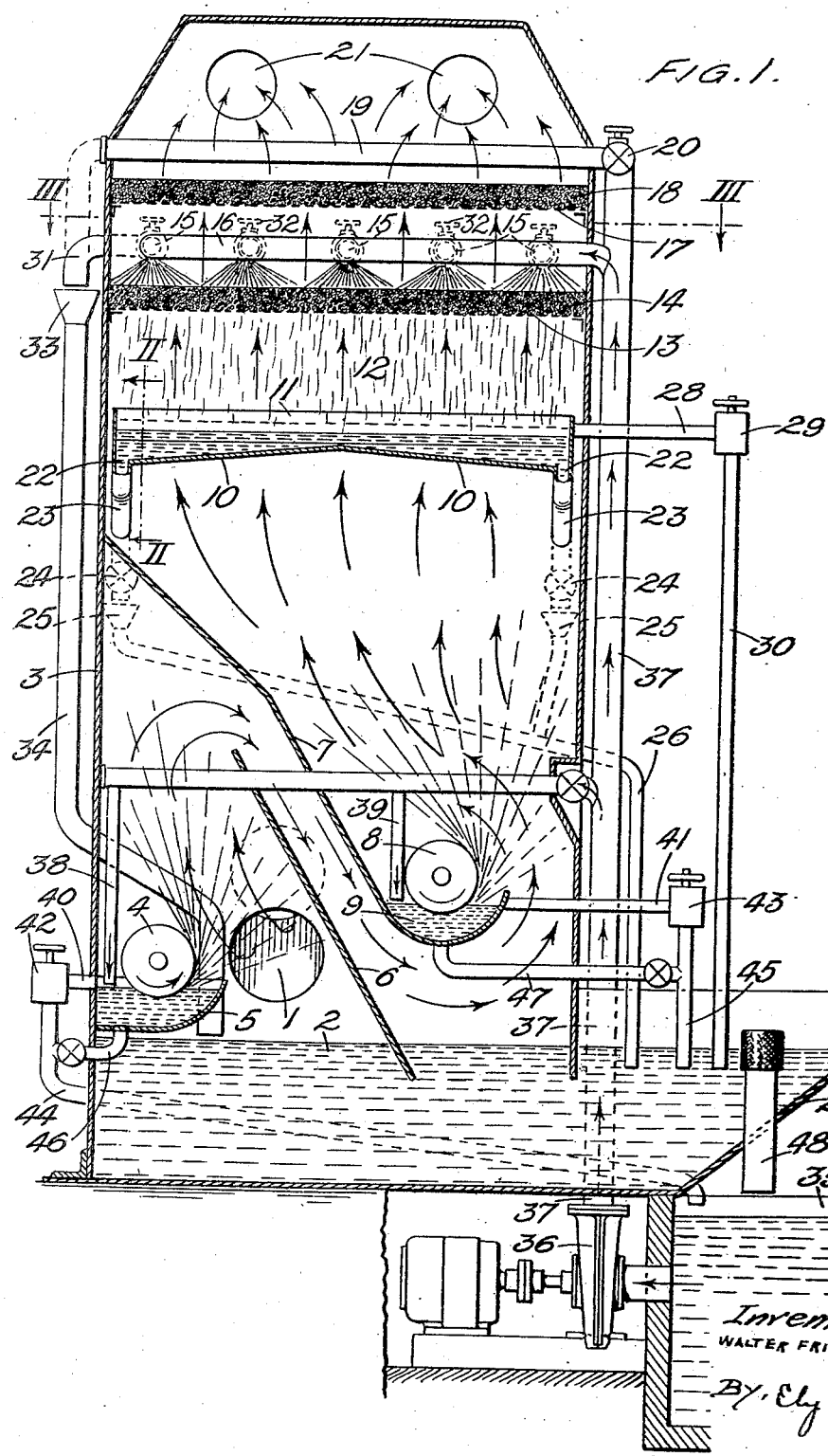

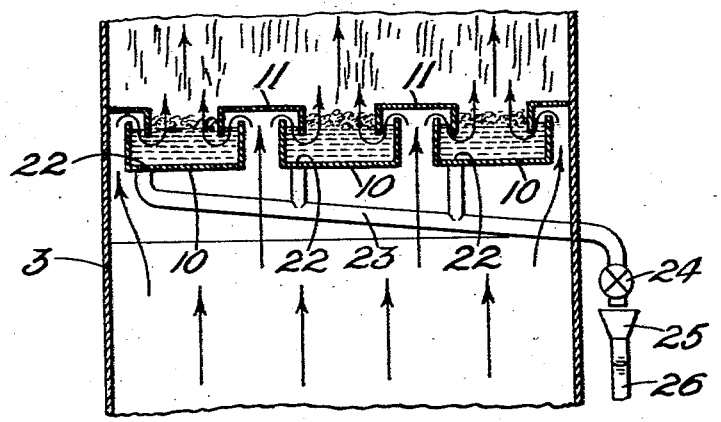
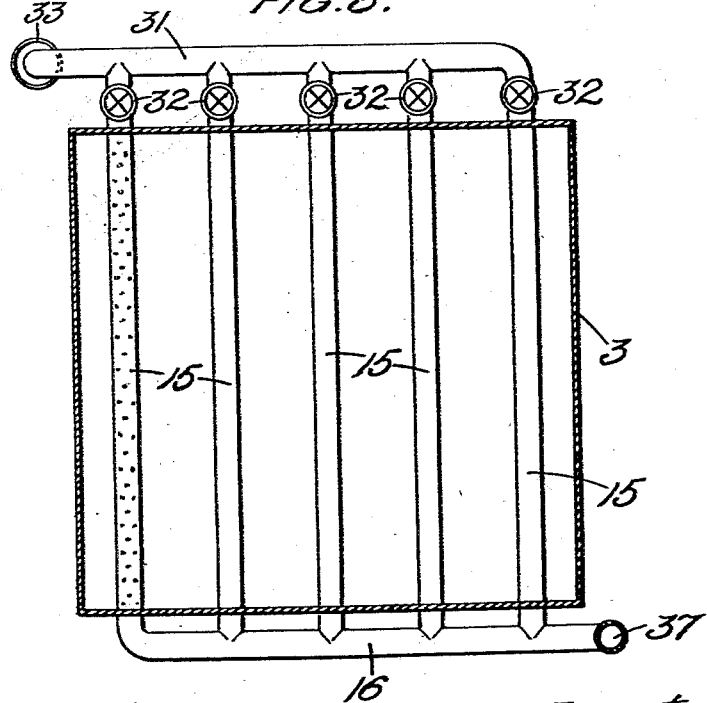

2,365,483

UNITED STATES PATENT OFFICE 2,365,483

SEPARATION OF FINE PARTICLES FROM GASES BY THE AID OF A WASHING LIQUID

Walter Fritz Mode, Cheam, England, assignor to Traughber Engineering Company, Cleveland, Ohio, a corporation of Ohio Application June 29, 1942, Serial No. 448,990
In Great Britain July 1, 1941

1 Claim. (Cl. 261—92)

This invention relates to the separation of fine particles from gases by the aid of a washing liquid and is concerned more particularly with methods and apparatus of the kind (hereinafter referred to as the kind specified) in which a body of washing liquid with or without a wetting agent is maintained around risers or troughs through which the gases are supplied and which are covered by bell-means or channels adapted to force the gases in fine streams substantially below the level of the liquid in such manner that, for instance, a froth is produced near the surface thereof, surplus froth being continuously removed through an overflow adapted to maintain a substantial layer of froth on the surface of the liquid and washing liquid and wetting agent being supplied as required to the main body thereof. If no froth is formed, the lighter particles of the dust which float on the surface of the washing agent will be removed by the overflow.

In such methods and apparatus, an example is that forming the subject-matter of British Patent No. 485,155, a proportion of the particles removed from the gases settles to the bottom of the body of washing liquid and in the prior proposals has been removed at intervals through drain-means. A disadvantage of this arrangement is that the gas cleansing operation must be interrupted during the cleaning of the apparatus but the chief difficulty is that experienced where it is a question of the removal of tarry, viscous, sticky, or like particles from the gases, namely, the settling of the particles into a coherent film or layer which also clogs the opening of the drain-means. In such cases the apparatus has frequently to be taken down in order to clear both the drain-means and the floor supporting the body of washing liquid.

The object of this invention is to provide improvements in methods and apparatus of the kind specified which shall overcome the disadvantages and difficulties just mentioned.

The invention can also be used in connection with the filter described in the British patent specification No. 485,155, certain changes in the arrangement of the spray chamber being effected whereby the gases are brought into more intimate contact with the washing liquid and by reversal of direction and impingement upon wetted surfaces are further cleaned of their dust burden. Thus the gases to be cleaned are passed through two or more sprays of washing liquid, baffle or partition means being provided between the sprays so as to cause the gases to substantially change direction and velocity and impinge upon the baffles, partitions or other surfaces. By so constructing the apparatus, the size and cost of apparatus for handling a given volume of gas is greatly reduced.

According to one feature of the invention a method of separating fine particles from gases, of the kind specified, is characterised by the continuous removal of washing liquid from near the bottom of the body of such liquid throughout the gas-cleansing operation.

Another feature of the invention is a method of the kind specified in which washing liquid is continuously removed from the lower part of the body thereof at a rate such that the normal supply of washing liquid and wetting agent is sufficient to maintain the necessary body of liquid while still providing for an overflow of spent froth or of liquid carrying the lighter particles.

Yet a further feature of the invention is apparatus for separating fine particles from gases, of the kind specified, wherein means is provided for continuously removing washing liquid from near the bottom of the body thereof throughout the gas-cleansing operation.

It is also a feature of the invention that the means for removing washing liquid is arranged to afford a visual indication of the flow of such liquid.

The invention will be clearly understood from the following description of one way of carrying it into effect, given by way of example, reference being had to the accompanying drawings, wherein—

Fig. 1 is a somewhat diagrammatic vertical section of a gas-cleansing apparatus such as is shown in British specification No. 485,155 but having the present invention applied thereto, Fig. 2 is a vertical section taken on the line 2—2 of Fig. 1, and Fig. 3 is a horizontal section taken on the line 3—3 of Fig. 1.

The apparatus shown resembles closely that of British specification No. 485,155 in a number of respects.

The gas to be cleansed is supplied through an inlet 1 just above the surface of a body of liquid 2 maintained in the lower part of a tower 3, the gas being directed downwardly so that large particles may enter the liquid by an inertia effect and other particles may be caught by the liquid. Above the liquid 2 is a spray drum 4 rotated with its surface just beneath the level of liquid held in a trough 5 so that a finely atomised spray or mist is produced in the space to be traversed by the gas. This space is preferably subdivided by partitions or baffles 6 and 7 into three passes, the first containing the drum 4 and trough 5 and the third containing a second rotating drum 8 and its trough 9, the gas path being shown by the arrows. Above the space thus subdivided is arranged a "floor" extending over the whole cross-section of the upper end of the third gas pass, the floor comprising a number of open-topped troughs 10 containing liquid and spaced apart to provide for the passage of gas between them. Each gas passage is covered by an inverted channel member 11 having its edges immersed in the liquid in the adjacent troughs 10 so that the gas is forced beneath the surface of the liquid before it escapes into the intermediate space 12 of the tower 3. This space is traversed by a fine rain of liquid falling from a perforated support 13 on which is arranged a layer 14 of Raschig rings, the upper surface of which is continuously sprayed with liquid from a number of perforated pipes 15 supplied from a common header 16. Above the pipe system 15 is provided a further perforated support 17 carrying another layer 18 of Raschig rings and above the upper surface of the latter is arranged a further system 19 of spray pipes which are supplied with liquid when desired through a valve 20. The gas which escapes through the layer 18 of Raschig rings passes to outlets 21 near the closed upper end of the tower 3, as indicated.

In general, the apparatus as so far described functions in the same way as that shown in the British specification referred to above, namely, the gas is cleansed of a large proportion of its suspended particles as it traverses the gas passes in the lower space and is then forced to bubble through the liquid supported by the "floor" 10, 11, where most of the fine particles are trapped in the liquid, preferably in a froth formed on its surface by the bubbling action owing to the addition of a wetting agent to the said liquid. Any suspended fine particles carried away by the gas from the "floor" 10, 11, are trapped in the Raschig ring layer 14 and the cleansed gas leaving the latter is dried substantially by its passage through the Raschig ring layer 18. The liquid used is generally recirculated, a settling tank being provided in the base of the tower from which relatively clean liquid is taken for supply to the necessary points. It is not necessary to re-circulate the liquid since fresh washing liquid may be supplied all the time, for example, water from the mains, from a river or the sea, or a mixture of fresh liquid and re-circulated liquid may be employed, especially where hot gases have to be cleaned.

The present invention provides primarily for continuous discharge of washing liquid from the "floor" 10, 11 and the means employed in accordance therewith will now be described.

As shown, the troughs 10 of the "floor" have bottom walls which slope downwardly and outwardly from their centre points to lead to drain openings 22. The openings at each side are all connected to a common header 23 which leads to the exterior of the main casing of the tower 3, there to terminate in an outlet shown as controlled by a valve 24 and spaced a short distance above a funnel 25. It is preferred in a number of cases to dispense with the valves 24 so that a possible source of clogging trouble may be avoided. The funnels 25 deliver to a common pipe 26 which discharges into an extension 27 of hopper-shape containing liquid in free communication with the body of liquid 2 in the tower 3.

The sizes of the drain openings 22 and/or the degree to which the valves 24 (when employed) are opened are so calculated and adjusted that the volume of liquid discharged therethrough in a given time is equal to the volume of liquid supplied above the "floor" 10, 11 less that volume of liquid over-flowing from the latter in the same time. The overflows are shown at 28 as each leading to an adjustable weir 29, by which the height of the liquid-level in the troughs may be varied, within limits, and discharging to the hopper 27 through pipes 30.

Due to this arrangement, there is a continuous discharge of washing liquid and suspended matter through the drain openings 22 with the result that a current of liquid is continuously sweeping over the bottom of each trough 10 constituting the "floor" and tarry matter or other suspended particles cannot settle thereon. The quantity and state of the liquid draining from the floor can easily be observed as it discharges into the funnels 25.

In some cases, the valves 24 (when employed) may be initially closed so that the initiation of the draining flow of liquid may take place under the pressure of a greater head of liquid.

As a further feature of the invention, the spray pipes 15 are connected at the ends remote from the header 16 to a collecting header 31, preferably as shown through controlling valves 32 for ensuring even distribution of the liquid to the spray pipes, and the header 31 is arranged to discharge into a funnel 33 externally of the casing of the tower 3, the funnel being arranged at the upper end of a pipe 34 which leads into the body of liquid 2. The rate of supply of liquid to the header 16 is greater than the total rate of discharge through the spray nozzles or openings of the pipes 15 so that there is a continuous discharge of the surplus liquid through the header 31, this being readily observed at the funnel 33. Due to this arrangement there is no danger of solids "packing up" at the ends of the pipes 15 remote from the header 16, as otherwise usually occurs when the pipes are blanked off at the said ends.

The pipe system 19, which is used from time to time to spray liquid over the upper layer 18 of Raschig rings for cleansing purposes, may also, if desired, have a through-flow provided by extending it as shown in dotted lines in Fig. 1.

Liquid is withdrawn from a sump 35 arranged beneath the level of the base of the tower 3 by a pump 36 and forced through a riser pipe 37 which supplies the troughs 5 and 9 through pipes 38 and 39, respectively, and also the header 16 and the pipe system 19. The correct levels of liquid in the troughs 5 and 9 are maintained by overflows 40 and 41, respectively, which discharge by way of adjustable weirs 42 and 43 and pipes 44 and 45 to the body of liquid in the sump 35 or in the base of the tower 3, respectively. Valve-controlled pipes 46 and 47 permit of draining the troughs 5 and 9 when necessary. The requisite level of liquid in the base of the tower is maintained by an overflow 48 discharging to the sump 35.

It is to be understood that the number of draining openings 22 may be varied and that the rate of supply of washing liquid and wetting agent, if employed, above the "floor" 10, 11 may be varied, within limits, in order to ensure the requisite flow through the draining openings or opening according to circumstances.

The essential aim of the present invention is the production of two currents, one near the surface and the other near the bottom of the bodies of washing liquid held in the troughs 10, which shall remove, respectively, the spent froth and the suspended particles settling towards the bottoms of the said troughs.

What I claim is:

Gas cleansing apparatus comprising a tower having a gas inlet to permit gas to be introduced therein, a first spray producing means within said tower, a second spray producing means within said tower, a partition within said tower separating said spray producing means but permitting gas to pass from the first to the second of said spray producing means, a sloping floor beyond said second spray producing means having openings therein to permit the passage of gas therethrough, cap members over said openings to force gas passing through said openings beneath the surface of a body of liquid supported by said floor, said floor having a first outlet at the foot of the slope and a second outlet above said first outlet, means to regulate the flow of washing liquid through said first outlet to control the current of washing liquid sweeping over said floor, means to regulate the flow of washing liquid through said second outlet to control the current of washing liquid across the surface of said body of liquid through said second outlet, and means to supply relatively clean washing liquid to said body to maintain said body at the level of said second outlet.

WALTER FRITZ MODE.